US006353449B1

(12) United States Patent
Gregg et al.
(10) Patent No.: US 6,353,449 B1
(45) Date of Patent: Mar. 5, 2002

(54) COMMUNICATING SCREEN SAVER

(75) Inventors: Leon Edward Gregg, Rochester, MN (US); William Jaaskelainen, Jr., Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/210,128

(22) Filed: Dec. 10, 1998

(51) Int. Cl.[7] .................................................. G06F 9/00

(52) U.S. Cl. ....................................... 345/762; 345/765

(58) Field of Search ................................ 345/331, 333, 345/335, 334, 339, 349, 751, 762, 765, 744, 764, 839; 705/1, 13, 14

(56) References Cited

U.S. PATENT DOCUMENTS 5,740,549 A * 4/1998 Reilly et al. .................. 705/14
5,930,501 A * 7/1999 Neil ........................... 345/334
6,014,135 A * 1/2000 Fernandes ................... 345/331
6,216,141 B1 * 4/2001 Straub et al. ............... 707/513

* cited by examiner

*Primary Examiner*—Cao H. Nguyen
(74) *Attorney, Agent, or Firm*—David A. Mims, Jr.; Robert V. Wilder

(57) ABSTRACT

A method and implementing computer system are provided in which screensavers are used to lock a workstation and present an eye-pleasing display while the user is away from the workstation. Users are enabled to select from a plurality of screensaver types which are applied in a screensaver mode. The screensaver displays include application indicia representative of work-in-progress when a screensaver mode was activated. The application indicia can be selectively obscured to hide work which may be of a sensitive or proprietary nature.

27 Claims, 12 Drawing Sheets

TABLE OF ALL WINDOWS:

| STATE | PRIOITY | NICKNAME | X-Y RANGE | PIXEL... | DISK ADDRESS |
|---|---|---|---|---|---|
| Displayed | 1 | Background | 1/1:100/100 | X'FE',X'FE',X | 02AA00 |
| Iconified | 2 | Lotus Notes | 4/4:2020 | X'1F',X'1F',X | 02BB00 |
| Displayed | 3 | MS Works | 50/40:80/79 | X'14',X72',X' | 1F0C00 |
| Displayed | 4 | DOOM2 | 22/13:60/45 | X'56',X'55',X | 1C4800 |
| Displayed | 5 | Netscape | 40/15:70/35 | X'00',X'00',X | 1BF000 |
| Displayed | 6 | Fax | 20/10:60/20 | X'40',X'40',X | 04DC00 |

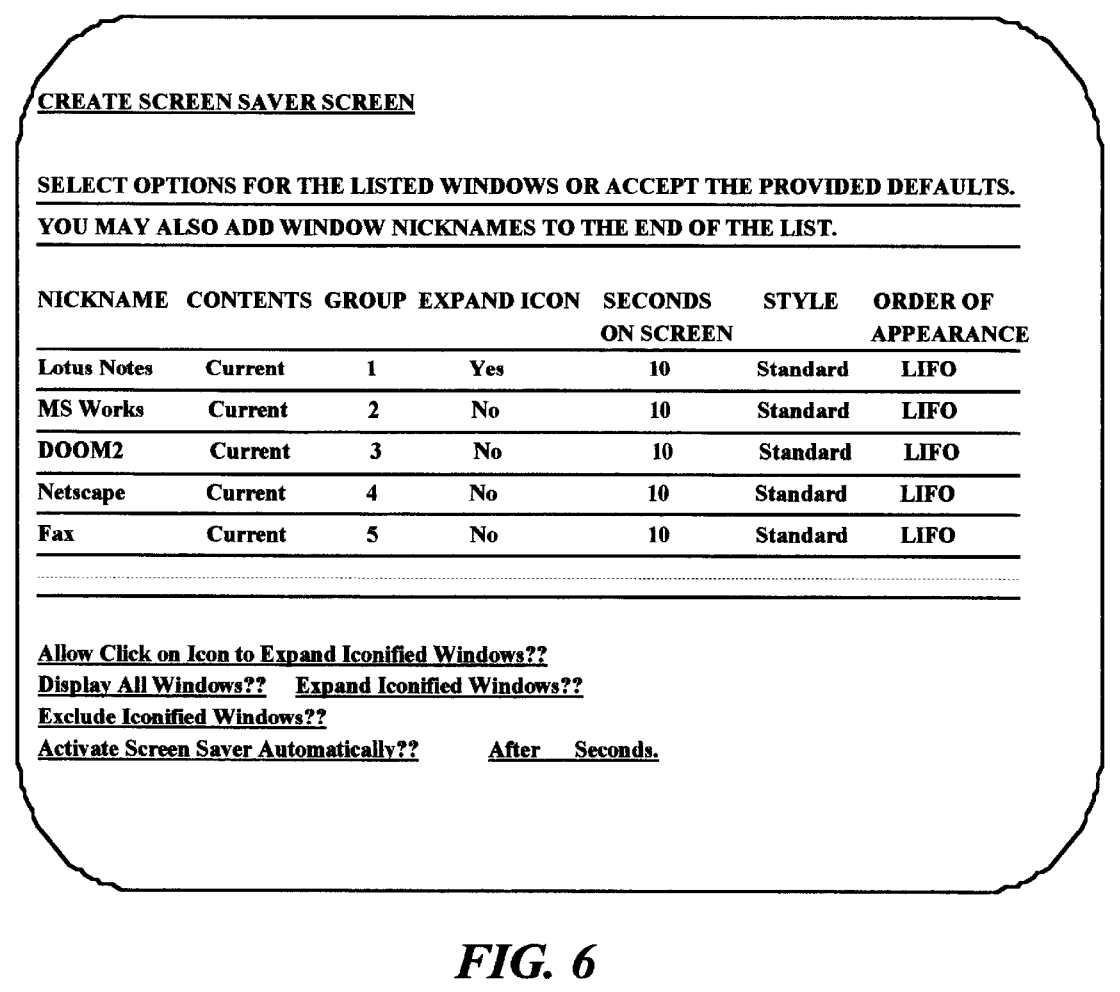

CREATE SCREEN SAVER SCREEN

SELECT OPTIONS FOR THE LISTED WINDOWS OR ACCEPT THE PROVIDED DEFAULTS.

YOU MAY ALSO ADD WINDOW NICKNAMES TO THE END OF THE LIST.

| NICKNAME | CONTENTS | GROUP | EXPAND ICON | SECONDS ON SCREEN | STYLE | ORDER OF APPEARANCE |
|---|---|---|---|---|---|---|
| Lotus Notes | Current | 1 | Yes | 10 | Standard | LIFO |
| MS Works | Current | 2 | No | 10 | Standard | LIFO |
| DOOM2 | Current | 3 | No | 10 | Standard | LIFO |
| Netscape | Current | 4 | No | 10 | Standard | LIFO |
| Fax | Current | 5 | No | 10 | Standard | LIFO |
| | | | | | | |

Allow Click on Icon to Expand Iconified Windows??

Display All Windows?? Expand Iconified Windows??

Exclude Iconified Windows??

Activate Screen Saver Automatically?? After Seconds.

*FIG. 6*

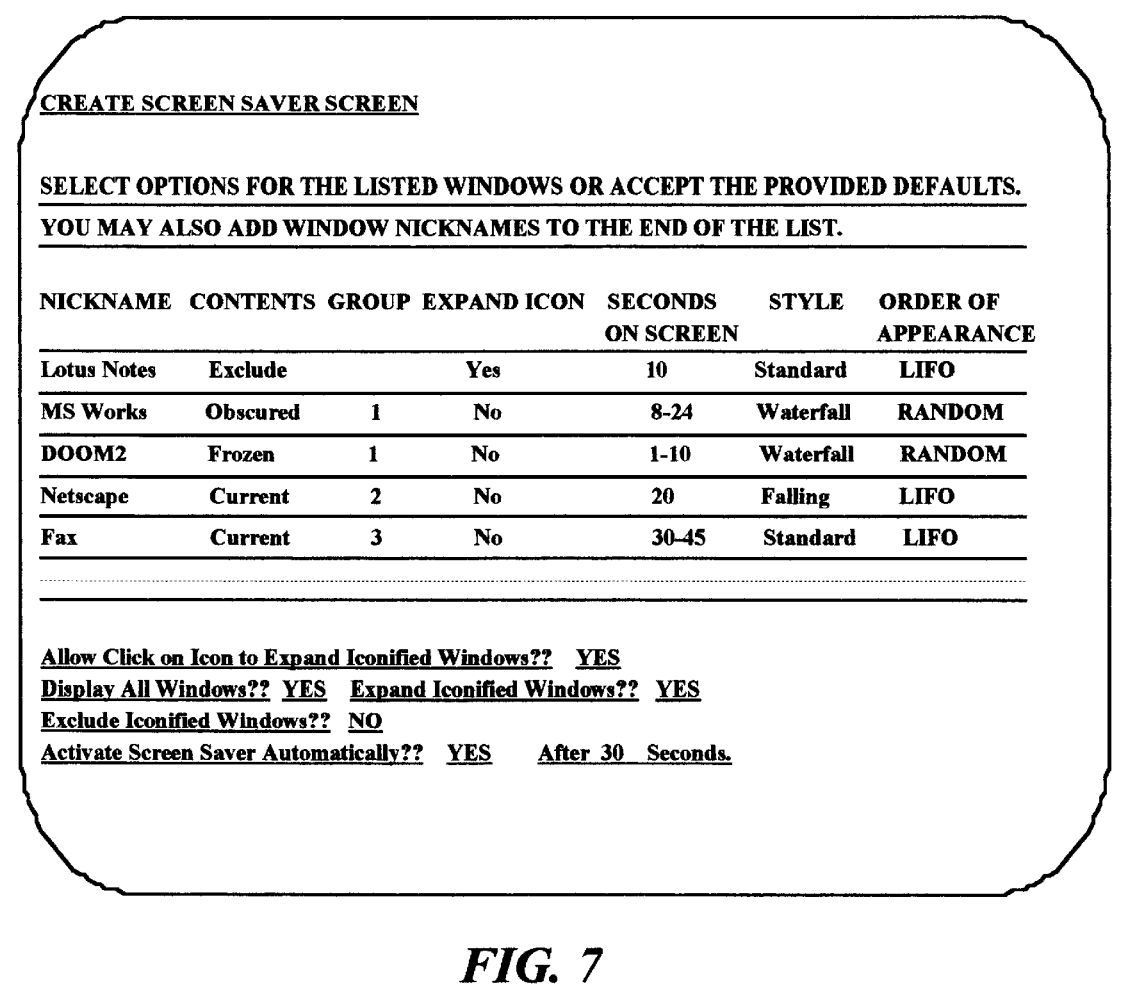

CREATE SCREEN SAVER SCREEN

SELECT OPTIONS FOR THE LISTED WINDOWS OR ACCEPT THE PROVIDED DEFAULTS.

YOU MAY ALSO ADD WINDOW NICKNAMES TO THE END OF THE LIST.

| NICKNAME | CONTENTS | GROUP | EXPAND ICON | SECONDS ON SCREEN | STYLE | ORDER OF APPEARANCE |
|---|---|---|---|---|---|---|
| Lotus Notes | Exclude | | Yes | 10 | Standard | LIFO |
| MS Works | Obscured | 1 | No | 8-24 | Waterfall | RANDOM |
| DOOM2 | Frozen | 1 | No | 1-10 | Waterfall | RANDOM |
| Netscape | Current | 2 | No | 20 | Falling | LIFO |
| Fax | Current | 3 | No | 30-45 | Standard | LIFO |

Allow Click on Icon to Expand Iconified Windows?? YES

Display All Windows?? YES Expand Iconified Windows?? YES

Exclude Iconified Windows?? NO

Activate Screen Saver Automatically?? YES After 30 Seconds.

*FIG. 7*

TABLE OF WORK - WINDOWS FOR SCREENSAVER

*Fixed Area - Appears Once*

CLICONEXP=YES
DSPALL=YES
EXPICON=YES
EXCLICON=NO
AUTOSTART=30

*Variable Area - One Entry Per Window*

| NICKNAME | Contents | Group | Expand Icon | Seconds On Screen | Style | Disk Address | Priority | Order of Appearance |
|---|---|---|---|---|---|---|---|---|
| Lotus Notes | Exclude | | Yes | | Standard | * | 2 | LIFO |
| MS Works | Obscured | 1 | No | 8-24 | Waterfall | * | 3 | RANDOM |
| DOOM2 | Frozen | 1 | No | 1-10 | Waterfall | 1C4800 | 4 | RANDOM |
| Netscape | Current | 2 | No | 20 | Falling | * | 5 | LIFO |
| Fax | Current | 3 | No | 30-45 | Standard | * | 6 | LIFO |

*FIG. 8*

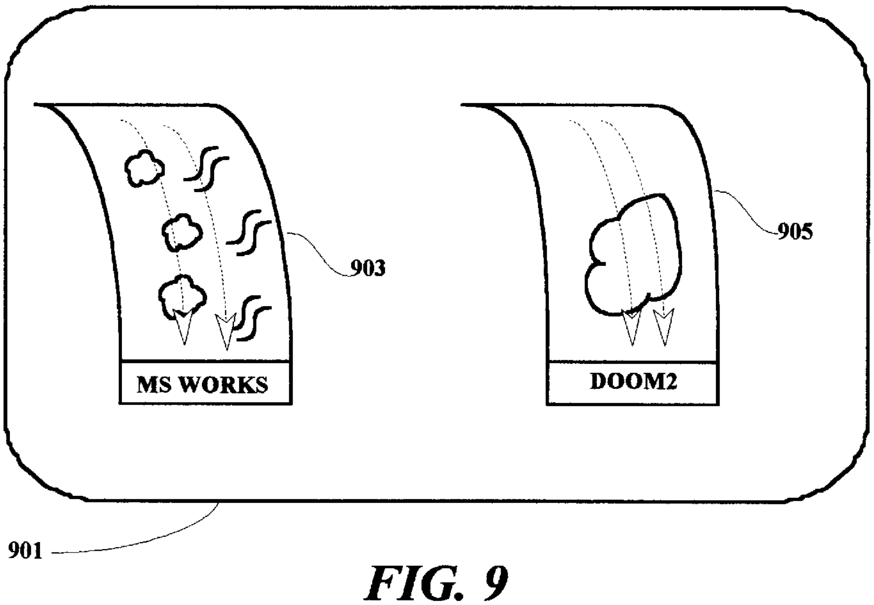

*FIG. 9*

COMMUNICATING SCREEN SAVER

FIELD OF THE INVENTION

The present invention relates generally to information processing systems and more particularly to a methodology and implementation for providing a screen-saver technique by which useful information may be selectively communicated in conjunction with the screen saving function on a computer display.

BACKGROUND OF THE INVENTION

A screensaver for a workstation provides a computer user with a means of manually or automatically locking the workstation when the computer user is either absent or inactive at the workstation for some period of time. While the workstation is locked, some attractive pattern is usually repetitively displayed until the workstation is unlocked. As is known in the computer art, the user can invoke the screensaver by clicking on a button, or can set certain screensaver parameter options to cause the screensaver to be invoked after some period of input inactivity. Usually, the screensaver is invoked after a few minutes of keyboard or mouse inactivity. Once invoked, the screensaver can only be deactivated by an input interrupt such as a movement of a mouse pointing device or a keyboard input. When interrupted, the screensaver will ask the user to input a correct password, and only then will the screen be restored to its last active state and accept additional input via the keyboard, mouse, or other input devices.

Although screensaver functions are successful in locking out unauthorized users, and also successful in preventing unauthorized users from even viewing work related information, they also prevent information from being viewed by authorized and appropriately interested users, such as work colleagues, team leaders, managers, and so forth. Since the safest method of workstation protection is to use automatic invocation of screensavers, the workstation user can also be blocked from even viewing his or her ongoing work and activity on the workstation when other work duties which take place at the desk, even as simple as lengthy telephone calls, prevent frequent use of the keyboard or mouse. Further, many installations require that any workstation that is inactive for fifteen minutes or more be automatically locked. As a result, users attempting to follow correct policy will have their own work hidden from them while completing other desk-bound duties.

Thus, there is a need for an improved methodology and implementing system which enables a more efficient and useful screen saver function which exceeds current screensaver functions by also displaying the ongoing work activity on the workstation even though the workstation is locked and input is inhibited.

SUMMARY OF THE INVENTION

A method and implementing computer system is provided in which screensaver presentations are selected by a user and selectively presented on the user's display device on command or after a predetermined period of inactivity. The user selected screen saver presentations are used to lock a workstation and present an eye-pleasing display on the CRT while the user is away from the workstation, and at the same time, provide a means for enabling a presentation of useful information to viewers of the display when the workstation is in the screen-saver mode. A work-oriented screen saver methodology provides a means of viewing work that was in progress when the user left the workstation, while selectively obscuring or hiding work which may be of a sensitive or proprietary nature.

BRIEF DESCRIPTION OF THE DRAWINGS

A better understanding of the present invention can be obtained when the following detailed description of a preferred embodiment is considered in conjunction with the following drawings, in which:

FIG. 6 is an example of a "Screensaver Option Create" screen, showing samples of user options;

FIG. 7 is another example of a "Screensaver Option Create" screen, showing samples of user options;

FIG. 8 is a Table of Work-Windows for Screensaver;

FIG. 9 is an example of a first exemplary screen-obscuring technique;

DETAILED DESCRIPTION

Figure 1:
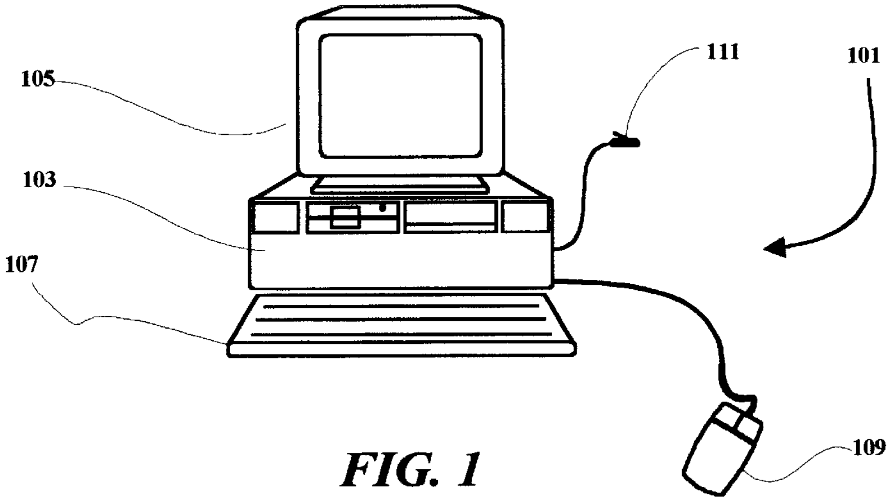
FIG. 1 is a diagram of a computer system in which the present invention may be implemented.
Figure 2:
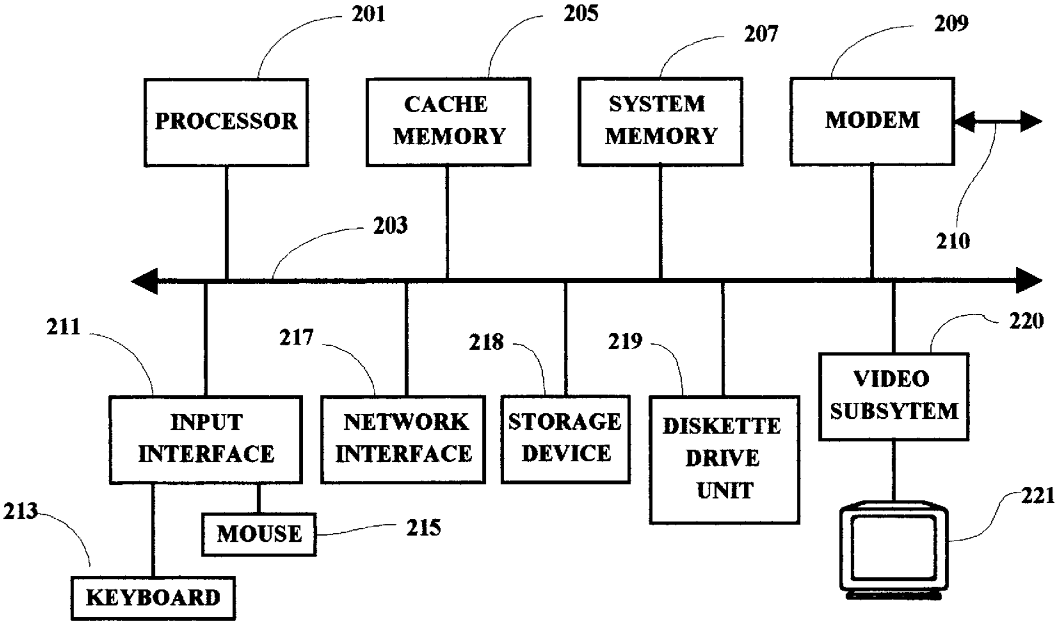
FIG. 2 is a simplified schematic diagram showing selected components and subsystems of the computer system illustrated in FIG. 1.

The present invention may be practiced in any suitable hardware configuration such as the workstation system illustrated in FIG. 1 and FIG. 2, or, alternatively, in a laptop or so called "network" computer, or any processing system which includes a display. Further, although references are made to the CRT phosphorous-saving function served by the screensaver technique, it is understood that the present invention applies also to flat panel and other non-CRT displays as well.

In FIG. 1, the computer system includes a processor unit 103 which is typically arranged for housing a processor circuit along with other component devices and subsystems of the computer system 101. The computer system 101 also includes a monitor unit 105 (which may be a CRT, a liquid crystal display, flat panel or other display device), a keyboard 107 and a mouse or pointing device 109, which are all interconnected with the computer system illustrated. Also shown is a connector 111 which is arranged for connecting a modem within the computer system to a communication line such as a telephone line in the present example. The present invention may also be implemented in a cellular or other wireless system.

Several of the major components of the system 101 are illustrated in FIG. 2. A processor circuit 201 is connected to a system bus 203 which may be any host system bus. It is noted that the processing methodology disclosed herein will apply to many different bus and/or network configurations. A cache memory device 205, and a system memory unit are also connected to the bus 203. A modem 209 is arranged for connection 210 to a communication line, such as a telephone line, through a connector 111 (FIG. 1). The modem 209, in the present example, selectively enables the computer system 101 to establish a communication link and initiate communication with another computer system, or network or database server.

The system bus 203 is also connected through an input interface circuit 211 to a keyboard 213 and a mouse or pointing device 215. The bus 203 is also coupled to a network interface subsystem 217 and a diskette drive unit 219. A video subsystem 220, which may include a graphics subsystem, is connected to a display device 221. A storage device 218, which may comprise a hard drive unit and/or an optical CD, is also coupled to the bus 203. The diskette drive unit provides a means by which individual diskette programs may be loaded on to the hard drive, or accessed directly, for selective execution by the computer system 101. As is well known, program diskettes containing application programs represented by magnetic indicia on the diskette, may be read from the diskette drive, and the computer system is selectively operable to read such magnetic indicia and create program signals. Such program signals are selectively effective to cause the computer system to present displays on the screen of a display device and respond to user inputs in accordance with the functional flow of the application program on the diskette.

In general, an implementing computer system may include a plurality of processors in a multi-bus system in a network of similar systems. However, since the workstation or computer system implementing the present invention in an exemplary embodiment, is generally known in the art and composed of electronic components and circuits which are also generally known to those skilled in the art, the computer system details beyond those shown in FIG. 1 and FIG. 2 are not specified to any greater extent than that considered necessary as illustrated, for the understanding and appreciation of the underlying concepts of the present invention and in order not to obfuscate or distract from the teachings of the present invention.

Figure 3:
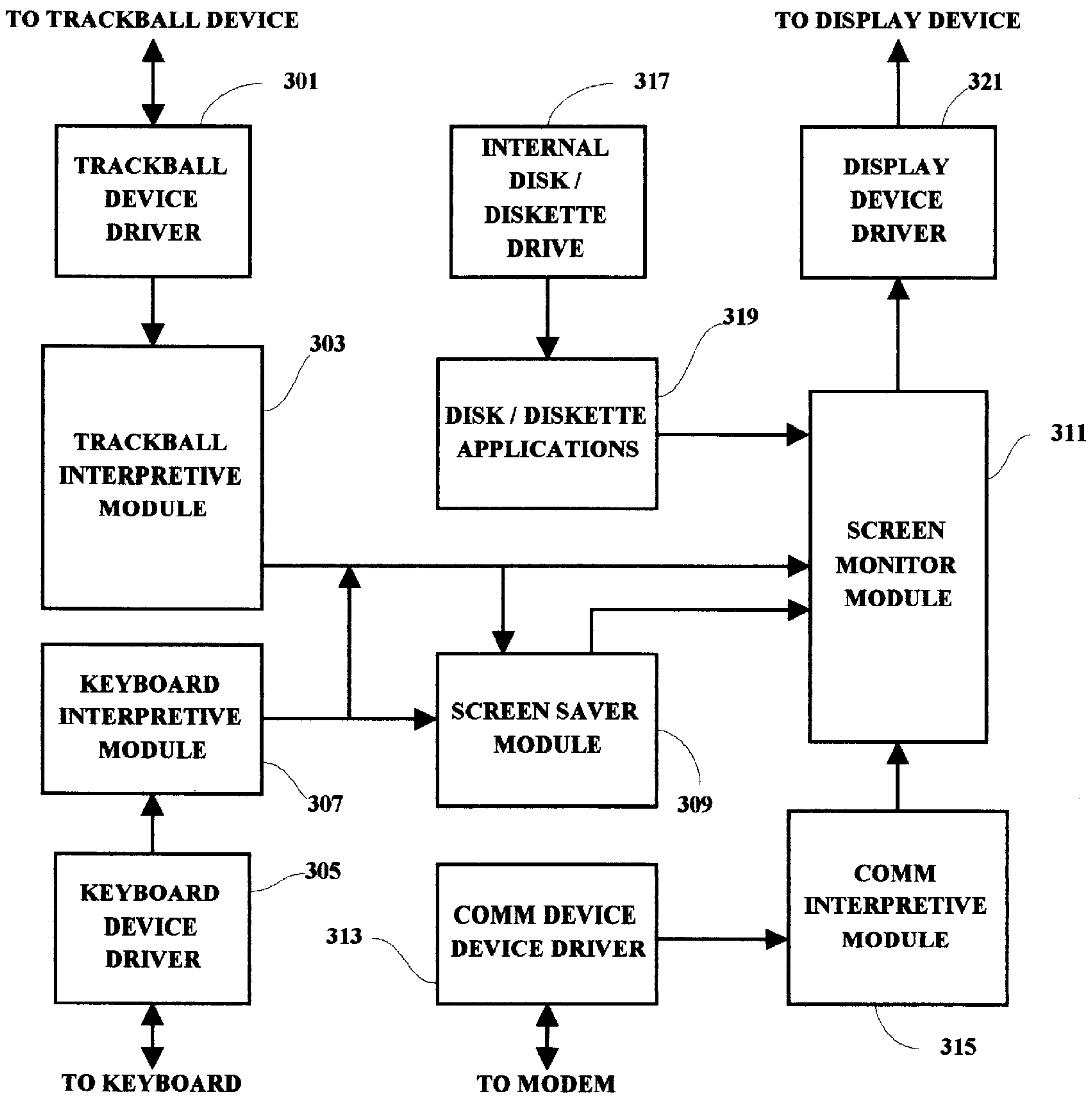
FIG. 3 is a functional block diagram of the system described in FIG. 2.

In FIG. 3, there is shown a functional block diagram of the various software modules within the exemplary system described in FIG. 2. As illustrated, the system includes a trackball device driver 301 which is coupled between a mouse trackball device and a trackball interpretive module 303. The trackball device may be a movable mouse riding on a trackball or a stationary base unit for a trackball which is mounted on the base. Where a stationary base unit is implemented, the ball itself is maneuvered by a user rather than the mouse device. The output of the trackball interpretive module 303 provides trackball input signals to a screen saver module 309 and also to a screen monitor module 311. The trackball input signals are representative of user inputs from the mouse/pointing device 109. The keyboard 107 is coupled through a keyboard device driver 305 and a keyboard interpretive module 307 to furnish inputs to the screen saver module 309 and also directly to the screen monitor module 311. The Screen saver module 309 also applies additional inputs to the screen monitor module 311. A COMM device driver 313 couples the modem 209 to a COMM interpretive module 315 which, in turn, provides input to the screen monitor module 311. An internal disk or diskette drive, or both 317, are operable to run disk or diskette applications 319 and provide application input to the screen monitor module 311. The screen monitor module 311 provides input signals to a CRT or other display device driver 321 in the exemplary illustration.

As illustrated, the screen monitor module coordinates the screen data flow from the various devices and applications into an orderly presentation of windowed information. When a "screensaver" function is invoked, some of the devices which interface with the screen monitor module are masked off by the locking functions of the screen saver module 309. Other devices may continue to function and therefore continue to update window images even though the screen is "locked".

The screen monitor module 311 has many internal subroutines to accomplish its overall function. As part of integrating keyboard and mouse, and modem (e.g. Internet) input, the screen monitor module (SMM) 311 must serve as the window manager for the system. The SMM 311 must handle window creation, window movement, window iconization, window resizing, and bring-window-to-focus, amongst many other functions. In order to manage these windows efficiently, it is necessary for the SMM 311 to maintain a "Table of All Windows" active or inconified for a particular session.

Figures 4, 5:
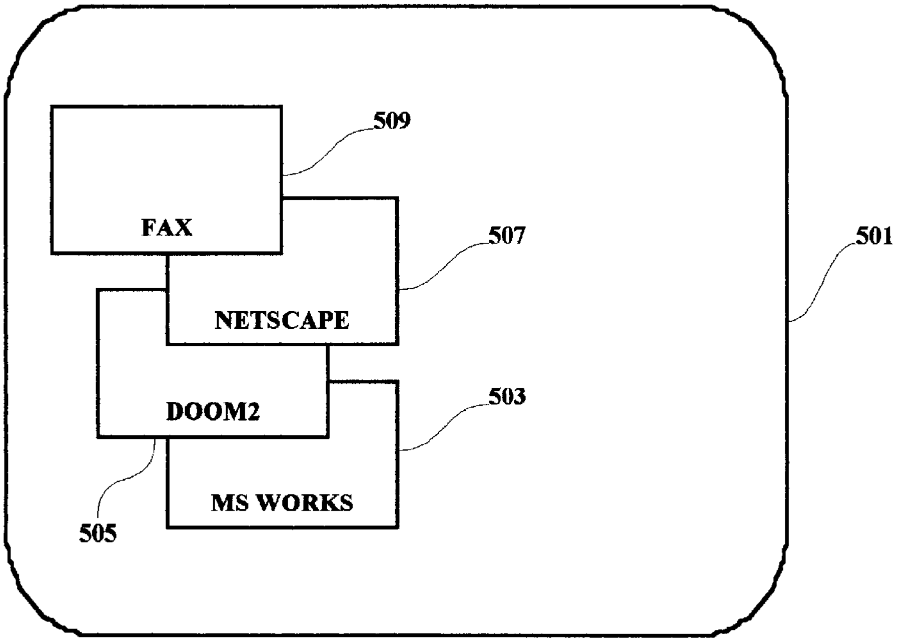
FIG. 4 is a Table of All Windows screen showing relationship between a screen of windows display and saved table information.
FIG. 5 is an exemplary screen display produced by the FIG. 4 Table of All Windows screen.

As shown in FIG. 4, the Table of All Windows contains information about the contents of each window, including the X-Y limits of the pixels for the window as it exists on the display and the disk location of the last saved copy of the window. The table always contains one default entry which describes the background for an entire screen display. Each entry for a window also contains an identifier or "nickname" for the window, which is usually the same or similar to the identifier or "nickname" commonly seen in the activate button or "pull-down bar" for a window. The user also can cause the X-Y coordinates of each window to change by moving or resizing windows about the screen. Software functions which create or modify the content of each window (such as Browsers) create or modify the value of the actual pixels contained in the Table of Windows. In order to correctly perform this function, these software functions must always first obtain the X-Y coordinate data from the table of windows. From these X-Y coordinates, the height and width of the window can be derived. Although the actual table is far more complex, for this example the screen is depicted as a 100×100 matrix.

The table entries in FIG. 4 would result in the screen display shown in FIG. 5. As the highest priority (i.e. "6" in the exemplary FIG. 4 table), the "Fax" window is atop all other windows. The order of display for the other windows is also determined by their priority, except for priority 2 (Lotus Notes), which is currently Iconified and is shown as an Icon (not shown) instead of as a separate Window. The actual pixel values in the each Table of Windows entry has been set by the application that interfaces with its window—Lotus Notes has set the pixel values for entry 2 in the Table of Windows, MSWorks has set the pixel values for entry 3, the "Doom2" application has set the Pixel values for entry 4, Netscape has set the pixel values for entry 5, and Fax has set the pixel values for entry 6. Coincidentally, the priority of each window is equal to the entry number for each window. However, the user can change this priority, and the X-Y coordinates of any entry by taking actions like mouse clicking or mouse "drag" and "resize" functions.

An enhanced screensaver option screen, "Create Screen Saver Screen", is illustrated in FIG. 6 and FIG. 7. The screensaver option screen allows the user to choose to display certain work oriented windows that were active when the screensaver was activated. The user can choose to display all the windows that were active, and can also specify a list of windows for special treatment. The user can also choose: to group certain windows together for display; to select a stylized or standard treatment of the display; to exclude or obscure certain windows; and to specify times or varying time lengths for each window or group of windows to be displayed. The user can also choose to allow iconfied windows to be expanded prior to display or to be expanded when clicked upon. The user can also choose to allow the display of a window frozen at the time the screensaver was activated, or display of the current contents. (Since certain tasks, such as a database search on the Internet may not complete until sometime after the user has left the workstation, this does make sense.) All of the users options are saved in a second Table of Work-Windows for Screensaver (FIG. 8) which is essentially a copy of the create options screen. This table need only be created once, but may be updated from time to time as the user desires.

Once the screensaver is activated, either automatically or manually, the processing essentially consists of comparing the list of windows in the Table of Windows (FIG. 4) to the Table of Work-Windows for Screensaver (FIG. 8). A flow chart is provided for this processing; but briefly, all the active windows are displayed using default values using the general rules specified by the user, unless a match is found between the Table of Windows and the Table of Work-Windows for Screensaver. When a match is found, the specific options for that window are applied. If a window in the Table of Work-Windows is not active when the screensaver is activated, no processing problems occur and no process harm is done, since no match is found.

The Screen Monitor Module is also responsible for detecting user interrupts, as when the user double clicks on an icon to initiate a new function, such as creating a set of screen saver options, as in FIG. 6. Once a function has been created, monitoring for invocation of the screensaver function is accomplished by detecting the click on the screensaver activate button, or by detecting that the number of seconds defined by the user or by system default has elapsed. As illustrated in FIG. 6, the user has clicked on a "Create Screensaver" button, and the screensaver function accesses the Table of All Windows to present the user with default options for the windows known to the system at that time. Note that the default values in FIG. 6 are derived from the table entries in FIG. 4. The user may now modify this screen to tailor the screensaver options as shown in FIG. 7.

FIG. 8 is a Table of Work-Windows for Screensaver. Note that the values in FIG. 8 are simply a saved record of the user options expressed in FIG. 7, plus information selected from the Table of All Windows (FIG. 4). Information selected from the Table of All Windows includes the disk address of windows which will be displayed "frozen", or as they existed at the time Screensaver was started. Windows given the "Current" option will have to be retrieved dynamically from the Table of all Windows. Other information selected from the Table of All Windows includes Priority, which will be used in certain ordering circumstances to supplement other ordering rules.

The Table in FIG. 8 need only be created once by the user, but may be updated whenever the user sees fit. It would be possible to create only the Fixed Area of the table, and allow system default values to control the display of all windows which happen to be active. In this case, the first iteration of Screensaver activation would dynamically create the variable portion of the Table. When creating the Table in FIG. 8, the user may specify Table Nicknames which do not happen to be active. Later activation of Screensaver will process these nicknames when an appropriate matching entry exists in the Table of All Windows.

Figure 10:
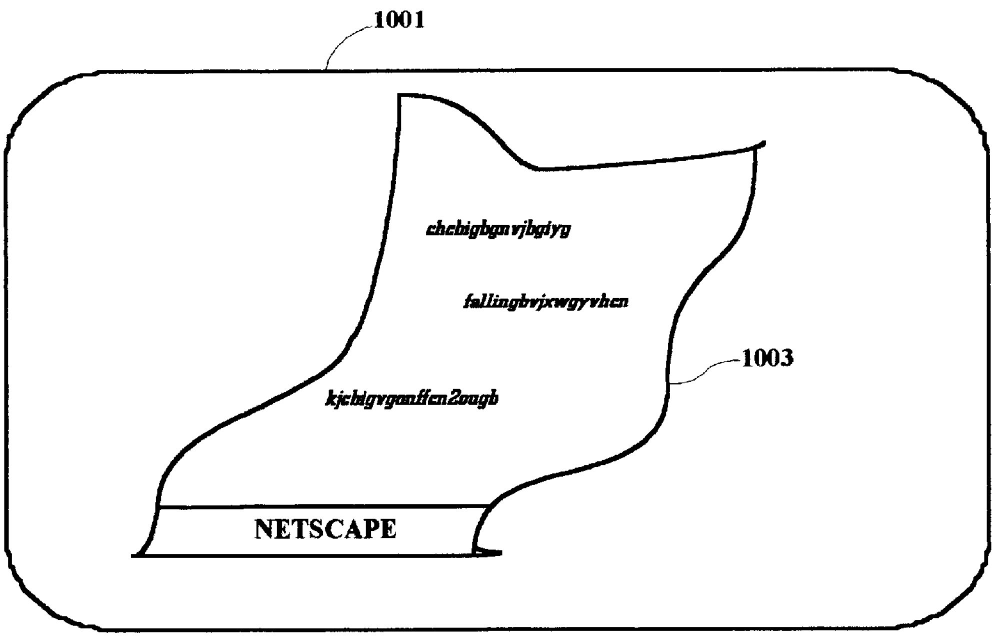
FIG. 10 is an example of a second exemplary screen-obscuring technique.
Figure 11:
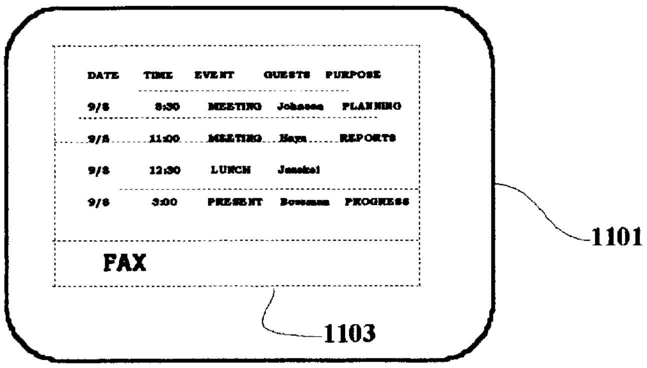
FIG. 11 is an example of a third exemplary screen-obscuring technique.

In FIGS. 9–11, several styles of the exemplary method of screen-saving are illustrated. In FIG. 9, a group of two window images 903 and 905 is displayed on a screen 901 as a pair in a "Waterfall" style to comply with user selected options. The windows appear to slide down a waterfall and then float off the screen as their time allowed on screen elapses. Note that the contents of the MSWorks window have been obscured (Refer to FIG. 7). As shown in FIG. 10, when a style designated as "Falling Leaf" has been selected, the window 1003 appears to "flutter" from the top to the bottom of the screen display 1001. As shown in FIG. 11, in the "standard" display, the FAX window 1101 appears in its normal, or standard format. The window simply "appears" to replace the previous window, and fades out when its time has elapsed. Windows may also appear from the left or from the right.

Figure 12:
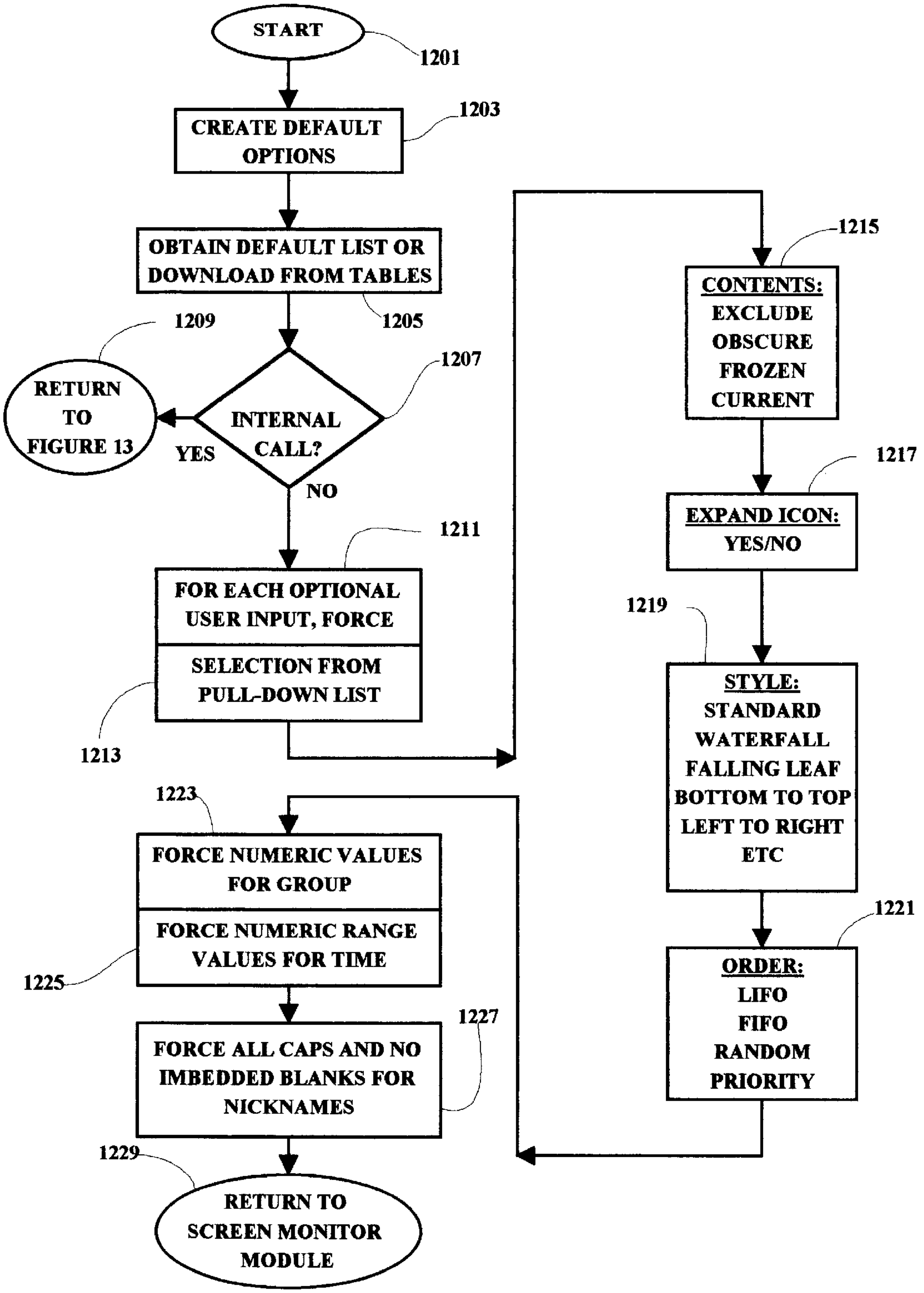
FIG. 12 is a flow chart showing an exemplary sequence of operations for creating work oriented screen saver options.

FIG. 12 is a flow chart showing an exemplary sequence of operations for creating work oriented screen saver options. As shown, after the process starts 1201, the default options are created 1203 and the default list is obtained or downloaded from tables 1205. Next a determination is made concerning whether or not this routine was called as an internal call (simply for the purpose of creating default entries in Table II, when the user has chosen to or forgotten to supply specific window options for screen saving). If so, the process returns to the process illustrated in FIG. 13. Otherwise, the process continues by implementing, for each user input 1211, a series of options selected 1213 by the user. These options include information found in the "Contents" column 1215, the "Expand Icon" column 1217, the "Style" column 1219 and the "Order" column 1221 of the "Create Screen Saver Screen" shown in FIG. 7. As further shown in FIG. 12, the flow continues by ensuring that values for grouping and time on screen have legal numeric values 1223, and if none have been assigned by the user, default values are assigned 1225. Finally the nicknames are forced to a format which will allow valid "compares" with system assigned names at a later time—for example, all characters are forced to upper case and embedded blanks are eliminated 1227. The process then returns to the screen monitor module 1229.

Figure 13:
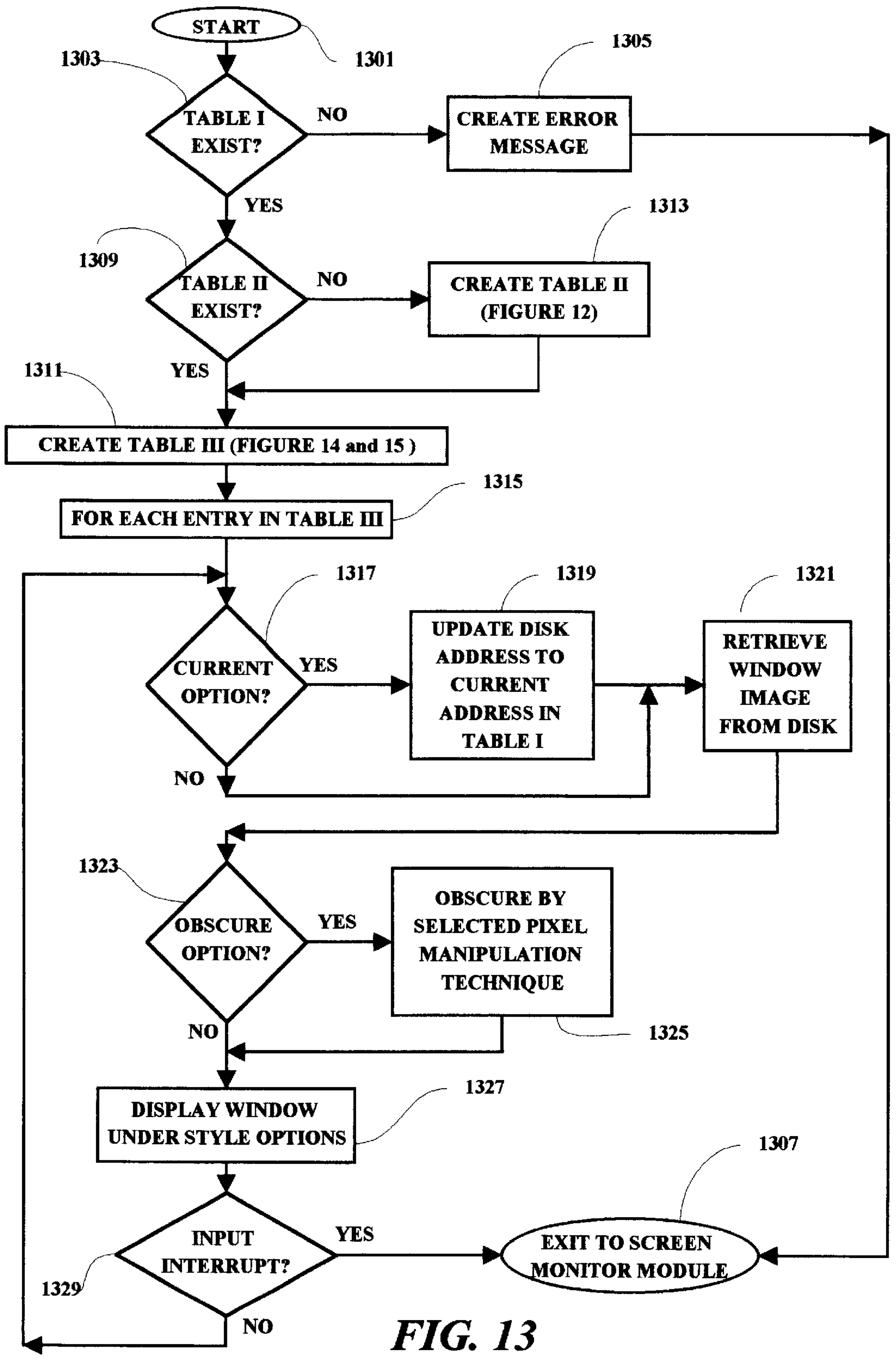
FIG. 13 is a flow chart showing an exemplary sequence of operations for screen-saver set-up and display.

FIG. 13 is a flow chart showing an exemplary sequence of operations for screen-saver set-up and display. As shown, when the process starts 1301, a check is made to determine if Table I exists 1301. Table 1 is the Table of All Windows which is illustrated in FIG. 4. If Table I does not exist, an error message is created 1305 and the process exits to the Screen Monitor Module 1307. If Table I does exist 1303, a check is made to determine if Table II exists 1309. Table II is the Table of Work-Windows for Screensaver which is illustrated in FIG. 8. If Table II exists, the program continues by creating Table III 1311. If Table II does not exist, it is created 1313 prior to the creation of Table III 1311. Table III is a merger of Tables I and II and is created through the steps illustrated in FIG. 14 and FIG. 15. Table III looks just like FIG. 8, which is Table II, Table of Work-Windows for Screensaver. Table III is basically a working copy of Table II which can be dynamically updated. Table II is the user specified set of options; Table III is a working copy with some data merged in from Table I on the fly, such as an updated disk address. Table III might contain more entries or less entries than Table II; for example, if DOOM2 is not active when screensaver is activated, there would be no entry created in the working copy, Table III, since there would be nothing to display for DOOM2. If the user had specified DISPLAY ALL in his options, when screensaver activates, entries would be created for all active windows, which might be more than those set in Table II. For those entries where a match is found in Table II, those options specified in Table II would be copied over to Table III, but default values would be created for those active windows which do not appear in Table II.

Table III has priority and order information created from copying Table II data where specified and assigning default values where no data is specified. The priority and order information, combined with time-on-screen options, determines which windows appear first in a sequence, second in a sequence, and so on. It can also specify that the sequence is RANDOM, in which case all the priorities would be equal or null. Group information determines which windows are grouped together for simultaneous display; Time determines how long windows or groups stay on the screen, and so on. In short, Table III controls the appearance, format, longevity, style, and other possible variables of the sequence of the windows which make up the changing screensaver image.

After creating Table III 1311, the program or process continues 1315 by checking and implementing user selected options for each entry in Table III. If the "Current" option has not been selected 1317, the window image is retrieved from storage or disk 1321 and a check is made to determine if the "Obscure" option has been selected 1323. If the "Current" option was selected 1317, the disk address is updated 1319 to the "current" address in Table I before retrieving the window image from disk 1321. If the "Obscure" option was not selected 1323, the screensaver window is displayed in accordance with the options chosen 1327. If the "Obscure" option was selected 1323, the particular style for the obscuration is determined 1325 and used in the display of the window 1327. The determination of the options is cycled until there is an input interrupt 1329 at which time the process exits to the screen monitor module 1307.

Figure 14:
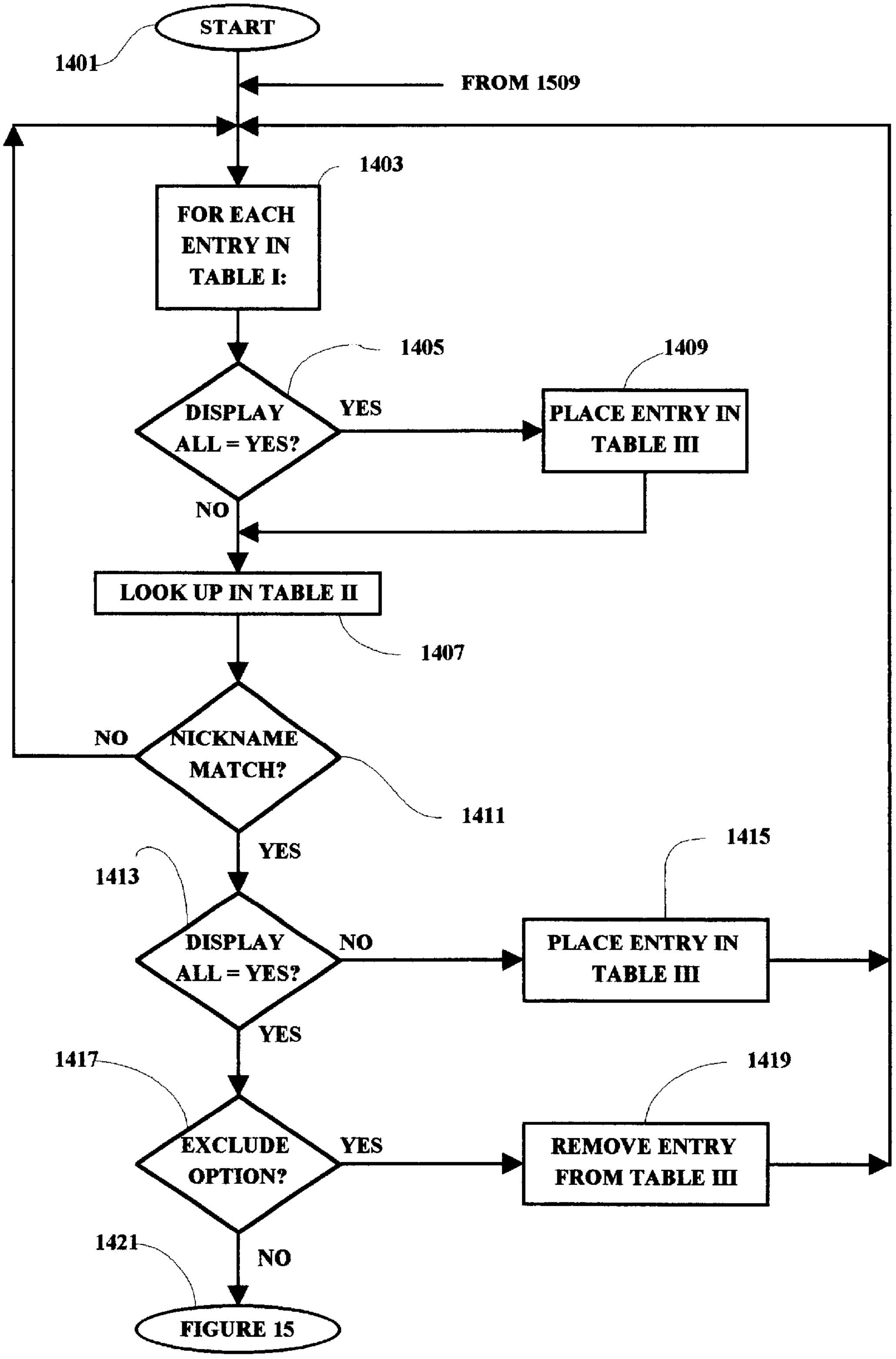
FIG. 14 is a flow chart illustrating an exemplary sequence of operations for Table III input processing.
Figure 15:
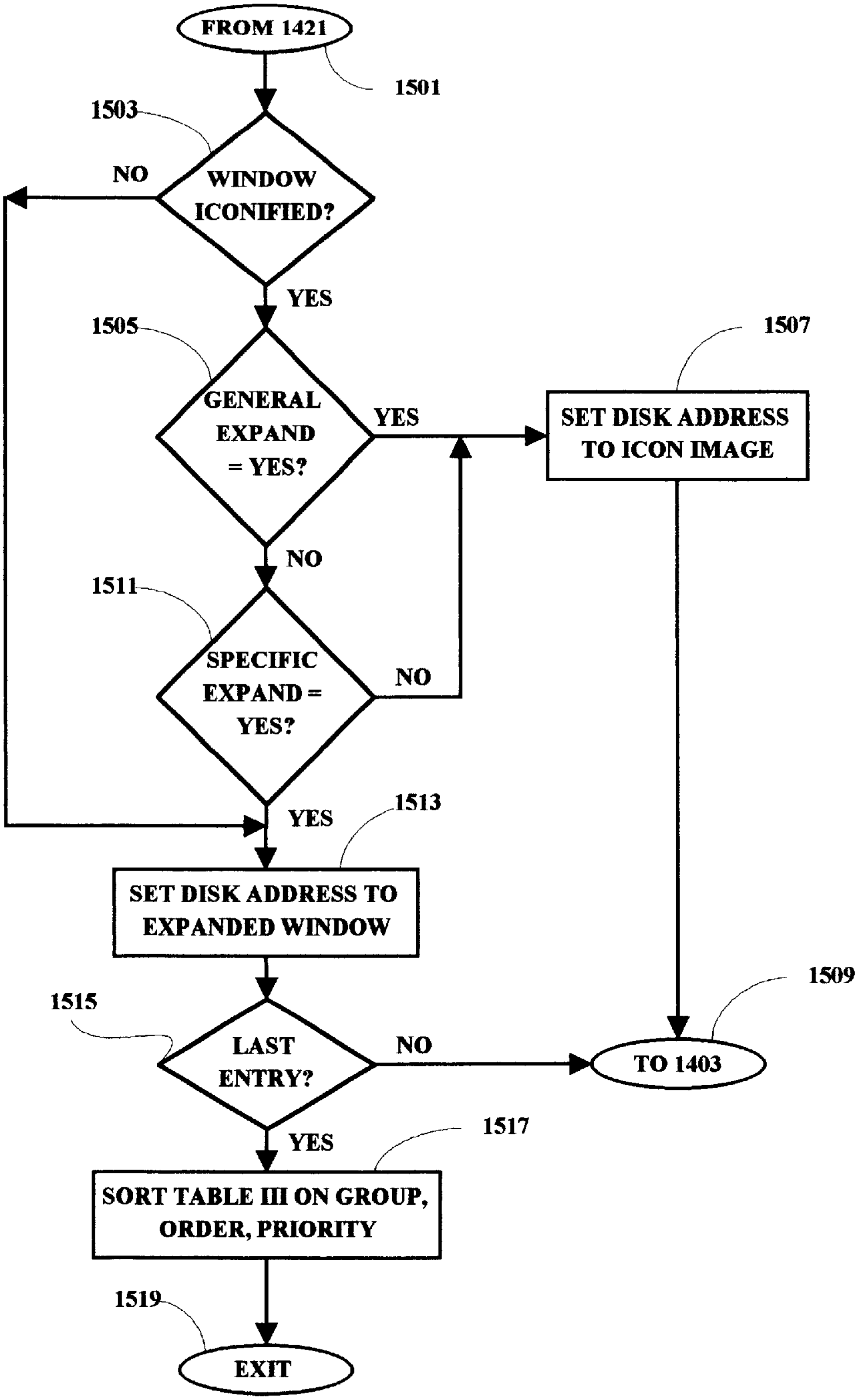
FIG. 15 is another flow chart illustrating an exemplary sequence of operations for Table III input processing.

FIG. 14 and FIG. 15 are flow charts illustrating the exemplary methodology for Table III input processing. As shown in FIG. 14, after the process starts 1401, the entries in Table I are checked. For each entry in Table I (FIG. 4) 1403, a check is made 1405 to see if the "State" column entry is "Displayed" or "Iconified". If all entries are marked "Displayed", the entries are placed in Table III 1409. If all entries are not marked as "Displayed", the entry is looked-up in Table II 1407 and a check for a "Nickname" match 1411 is made. If there is no nickname match, the cycle is repeated for the next entry in Table I. If there is a nickname match 1411, another check is made to determine if the "Displayed" column is selected 1413. If not selected, the entry is placed in Table III 1415 and the process returns to cycle the next entry in Table I 1403. If "Display All" option was selected, a check is made for the "Exclude" option 1417. If the "Exclude" option was selected, the entry is removed from Table III 1419 and the process returns to cycle the next entry in Table I 1403. If the "Exclude" option was not selected 1417, the processing continues 1421 as illustrated in FIG. 15.

In FIG. 15, the processing continues from FIG. 14 1501 and a check is next made as to whether the window of the screensaver is currently Iconified 1503. If the screensaver window being processed is not Iconified, the process moves to block 1515. If the screensaver window being processed is Iconified, a check is made to determine if the user had generally specified that all Iconified windows were to be expanded 1505, or if this specific window was to be expanded if it was Iconified 1511. If there is a need for Icon expansion, the processing sets the disk address to the expanded window 1513. If no expansion is required, processing sets the disk address to the disk address of the Icon image 1507 and the processing returns 1509 to FIG. 14 as shown. When the last entry is detected 1515, Table III is sorted on Group, Order and Priority 1517 and the processing is completed 1519.

Figure 16:
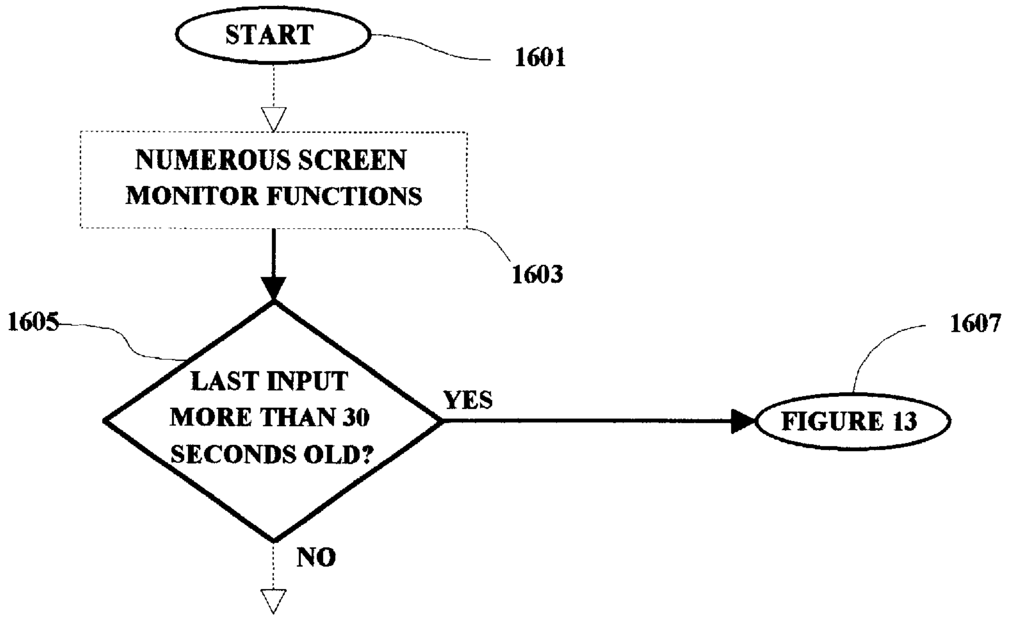
FIG. 16 is a flow chart illustrating an exemplary sequence of operations for screen saver activation.

In FIG. 16, there is shown an exemplary process used to initiate or activate the screen saver function. As illustrated, after the screen monitor module is started 1601, the screen monitor functions are performed 1603 and a continual check is made 1605 to determine the time elapsed since the last input, such as a keyboard or mouse input, is received from a user. When no input is received for a predetermined period of time (such as 30 seconds in the example), the screensaver function shown in FIG. 13 is activated 1607, to present a screensaver display in accordance with the programmed and selected screensaver options. Normal program processing continues and the screensaver function is not activated so long as user inputs continue to be received within the prescribed predetermined time period.

Figure 17:
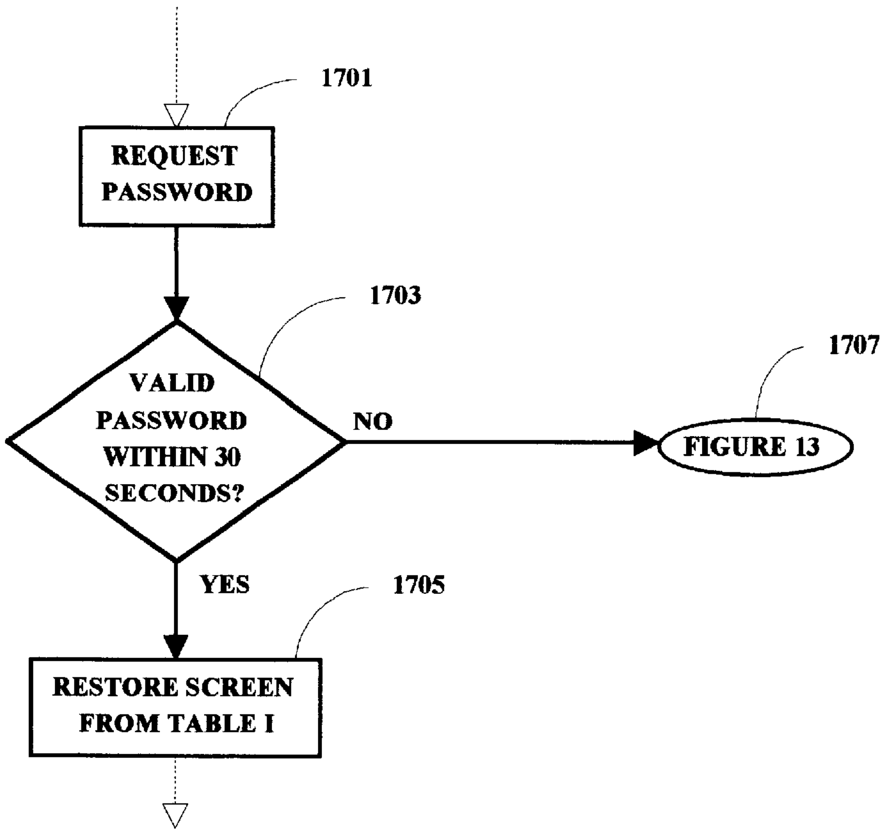
FIG. 17 is a flow chart illustrating an exemplary sequence of operations for a return from screen saver mode.

In FIG. 17, a flow chart illustrating an exemplary sequence of operations for a return from screen saver mode. In the example, when the screen saver is functioning and displaying selected screensaver images, when any key on the keyboard is pressed or the mouse or trackball is moved, a request to enter a password 1701 is presented on the screen. If a valid password is entered 1703 in less than a predetermined period of time (such as 30 seconds), the screen returns to the Table I—Table of All Windows presentation 1705. Alternatively, the user may be returned to an application program running at the time the screensaver function was invoked. If a valid password is not entered in a prescribed amount of time, the process returns 1707 to reactivate the screensaver function as illustrated in FIG. 13.

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely in program code stored on a disk or diskette (portable or fixed), or other memory device, from which it may be executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for implementing a screensaver technique, said method being adaptable for use with a computer system, said computer system being selectively operable for executing at least one application program and displaying a working screen for said one application to a user on a display screen of a display device, said working screen being continuously changeable in response to user input, said method comprising:

activating a screensaver mode function; and modifying said working screen to appear as one of a plurality of selectable application images on said display screen, each application image containing display indicia representative of information present on said working screen of a corresponding application program when said screensaver function was activated, wherein selected ones of said application images are on said display screen during a continuance of said screensaver mode.

2. The method as set forth in claim 1 wherein said screensaver mode function is automatically activated after a predetermined period of user input inactivity.

3. The method as set forth in claim 1 wherein said screensaver mode function is actively initiated by said user.

4. The method as set forth in claim 1 wherein said selectable application image is reduced in size from said working screen of said corresponding application program.

5. The method as set forth in claim 1 wherein contents of said working screen are decipherable from said display indicia.

6. The method as set forth in claim 5 and further including:

restoring said working screen to said display screen in response to a predetermined condition.

7. The method as set forth in claim 6 wherein said predetermined condition is a predetermined input from a user.

8. The method as set forth in claim 7 wherein said predetermined input from said user is a password input.

9. The method as set forth in claim 1 wherein contents of said working screen are undecipherable from said display indicia.

10. The method as set forth in claim 1 wherein said display screen is a cathode ray tube display device.

11. The method as set forth in claim 1 wherein said display device is a flat screen device.

12. The method as set forth in claim 1 wherein said display device is a liquid crystal display device.

13. The method as set forth in claim 1 wherein said computer system is arranged to execute a first number of application programs, said first number being greater than one, said method further including:

selectively providing a second number of application images, said application images containing display characteristics uniquely representative of an application program being represented by said application image.

14. The method as set forth in claim 13 and further including:

presenting an application image selection screen to said user to enable said user to select a particular application image to represent any of said application programs.

15. The method as set forth in claim 13 wherein said application images are selectively presented and removed from said display screen such that only one application image is present on said display screen at any given time.

16. The method as set forth in claim 13 wherein said application images are selectively presented on said display screen such that all user-selected application images are presented on said display screen during said screensaver mode.

17. The method as set forth in claim 1 wherein said computer system is arranged to execute a first number of application programs, said first number being greater than one, said method further including:

selectively providing a second number of application images, said application images containing display characteristics representative of an application program being represented by said application image, said second number being equal to said first number whereby each of said application programs is represented by a corresponding application image on said display screen during said screensaver mode.

18. The method as set forth in claim 1 wherein said computer system is arranged to execute a first number of application programs, said method further including:

selectively providing a second number of application images, said application images containing display characteristics representative of corresponding application programs being represented by said application images, said second number being less than said first number whereby selected ones of said application program working screens are omitted from being displayed on said display screen during said screensaver mode.

19. The method as set forth in claim 1 and further including:

moving said application image on said display screen during said screensaver mode.

20. The method as set forth in claim 19 wherein said screensaver mode is terminated when said user actuates said input pointing device while pointing said input pointing device at said application image while said application image is moving on said display screen.

21. The method as set forth in claim 1 and further including:

presenting a screensaver format selection screen to said user; and modifying said application images to conform to a screensaver format selected by said user.

22. The method as set forth in claim 21 wherein one of said screensaver formats is effective to present said application image enclosed within a shape of a falling leaf, said falling leaf appearing to fall across said display screen.

23. The method as set forth in claim 21 wherein one of said screensaver formats is effective to present said application image enclosed within a bouncing ball, said bouncing ball appearing to bounce across said display screen.

24. The method as set forth in claim 21 wherein one of said screensaver formats is effective to present said application image enclosed within a shape of a waterfall, said application image appearing to flow over said waterfall.

25. The method as set forth in claim 21 wherein one of said screensaver formats is effective to present said application image continuously appearing and fading out from said display screen.

26. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being effective to implement a screen saver processing methodology by which a screen saver display may be selected and presented on a user display screen, said program signals being effective for:

activating a screensaver mode function; and modifying said working screen to appear as one of a plurality of selectable application images on said display screen, each application image containing display indicia representative of information present on said working screen of a corresponding application program when said screensaver function was activated, wherein selected ones of said application images are displayed on said display screen during a continuance of said screensaver mode.

27. An information processing system comprising:

a system bus;

a user input device coupled to said system bus;

a processing device coupled to said system bus;

a memory unit coupled to said system bus; and a display device coupled to said system bus, said processing device being selectively responsive to program signals from said memory unit for implementing a screensaver technique, said processing device being selectively operable for executing at least one application program and displaying a working screen for said one application to a user on a display screen of a display device, said working screen being continuously changeable in response to user input, said processing device being further selectively operable for activating a screensaver mode function and modifying said working screen to appear as one of a plurality of selectable application images on said display screen, each application image containing display indicia representative of information present on said working screen of a corresponding application program when said screensaver function was activated, wherein selected ones of said application images are displayed on said display screen during a continuance of said screensaver mode.

* * * * *